United States Patent
Flehmig

(10) Patent No.: US 9,908,166 B2
(45) Date of Patent: Mar. 6, 2018

(54) SHEET METAL BLANK HAVING A HOMOGENEOUS THICKNESS TRANSITION

(75) Inventor: Thomas Flehmig, Ratingen (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 2053 days.

(21) Appl. No.: 12/727,842

(22) Filed: Mar. 19, 2010

(65) Prior Publication Data

US 2010/0236316 A1 Sep. 23, 2010

(30) Foreign Application Priority Data

Mar. 23, 2009 (DE) .......................... 10 2009 003 655

(51) Int. Cl.
| | |
|---|---|
| *B21D 28/00* | (2006.01) |
| *B21D 28/02* | (2006.01) |
| *B21C 37/02* | (2006.01) |
| *B21C 37/06* | (2006.01) |
| *B23K 26/24* | (2014.01) |

(Continued)

(52) U.S. Cl.
CPC .............. *B21D 28/02* (2013.01); *B21C 37/02* (2013.01); *B21C 37/065* (2013.01); *B23K 26/24* (2013.01); *B23K 33/008* (2013.01); *B23K 2201/185* (2013.01); *Y10T 428/12229* (2015.01)

(58) Field of Classification Search
CPC ......... F16H 57/08; B21D 39/031; B21D 1/10; B21D 13/04; B21D 39/021; B21D 35/006; B21D 53/04; B21D 24/05; B23K 26/00; B23K 9/00; B23K 26/3293; B23K 15/00

USPC ......... 72/185, 186, 203, 204, 214, 220, 234, 72/338, 339, 363, 379.2, 332, 347, 348; 29/505, 509, 514, 521, 524, 525.14, 417, 29/412, 414; 428/577; 228/112.1, 228/121.64, 164, 165, 166, 167, 168, 169, 228/170, 171, 172, 173, 174; 219/121.14, 219/137 R; 296/146.8, 106

See application file for complete search history.

(56) References Cited

U.S. PATENT DOCUMENTS

| | | | | |
|---|---|---|---|---|
| 2,882,766 | A | * 4/1959 | Towler ........................... | 72/20.1 |
| 3,989,919 | A | * 11/1976 | Wefers et al. .................. | 219/94 |
| 5,037,024 | A | * 8/1991 | Minato et al. ................. | 228/125 |

(Continued)

FOREIGN PATENT DOCUMENTS

| | | |
|---|---|---|
| CA | 2001636 | 4/1990 |
| CN | 1158763 A | 9/1997 |

(Continued)

*Primary Examiner* — Dmitry Suhol
*Assistant Examiner* — Peter Iannuzzi
(74) *Attorney, Agent, or Firm* — Reinhart Boerner Van Deuren P.C.

(57) ABSTRACT

A method for manufacturing a sheet metal blank, in particular a tailored blank, in which at least two metal sheets are connected to one another at their respective connecting edges, the two metal sheets displaying differing thickness is provided herein and allows in a simple manner an application-specific configuration of the region of transition from one metal sheet thickness to another metal sheet thickness. The method includes a step in which, prior to the connecting of the two metal sheets, at least the region of the connecting edge of the thicker of the two metal sheets is pressed to a predefinable thickness in a forming tool in such a way that the connecting edges of the metal sheets display substantially the same thickness.

7 Claims, 3 Drawing Sheets

(51) Int. Cl.
*B23K 33/00* (2006.01)
*B23K 101/18* (2006.01)

(56) References Cited

U.S. PATENT DOCUMENTS

| | | | |
|---|---|---|---|
| 5,343,010 A * | 8/1994 | Urech | 219/83 |
| 5,550,345 A * | 8/1996 | Meier et al. | 219/121.63 |
| 6,070,448 A * | 6/2000 | Eipper et al. | 72/363 |
| 6,241,307 B1 * | 6/2001 | Kim | 296/146.8 |
| 6,261,701 B1 * | 7/2001 | Fields, Jr. | 428/577 |
| 6,957,848 B2 * | 10/2005 | Walther | 296/191 |
| 2011/0151271 A1 * | 6/2011 | Keys | 428/571 |

FOREIGN PATENT DOCUMENTS

| | | | |
|---|---|---|---|
| DE | 19722245 | 12/1998 | |
| DE | 19962512 | 8/2000 | |
| DE | 10 2004 035 887 A1 | 3/2006 | |
| EP | 0565846 * | 4/1993 | B23K 33/00 |
| JP | H0615469 A | 1/1994 | |
| WO | WO9703787 * | 7/1995 | B23K 26/08 |
| WO | WO9619306 * | 6/1996 | B21D 39/00 |
| WO | WO 9619306 * | 6/1996 | B21D 39/00 |

* cited by examiner

SHEET METAL BLANK HAVING A HOMOGENEOUS THICKNESS TRANSITION

CROSS-REFERENCE TO RELATED APPLICATION

This application claims the benefit of and priority to German patent application no. DE 10 2009 003 655.5-14, filed on Mar. 23, 2009. The disclosure of the above application is incorporated herein by reference in its entirety.

FIELD OF THE INVENTION

The invention relates to a method for manufacturing a sheet metal blank, in particular a tailored blank, in which at least two metal sheets are connected to one another at their respective connecting edges, the two metal sheets having differing thickness. In addition, the invention relates to a sheet metal blank, in particular a tailored blank, and to a forming tool, in particular for carrying out the method for manufacturing a sheet metal blank, in particular a tailored blank.

BACKGROUND

Semi-finished products or sheet metal blanks, in particular tailored blanks, are used in the manufacture of motor vehicles, in particular in the manufacture of bodywork components for motor vehicles. On account of different demands placed on these sheet metal blanks, tailored blanks are frequently composed of a plurality of metal sheets of differing thickness that are firmly bonded to one another, generally welded. Many applications of sheet metal blanks require a sheet metal blank to have homogeneous transitions between metal sheets of differing thickness. On the one hand, this is required in order to design load curves of the components without force jumps or spontaneous malfunction behaviour. Furthermore, a zone of homogeneous transition from one metal sheet thickness to the other is desirable in order to ensure better flowing and increased degrees of deformation during subsequent forming processes. Furthermore, joining-together of connecting edges of differing thicknesses by means of laser welding is problematic.

What is known as flexible rolling is known in the art for producing homogeneous sheet metal transitions between different sheet metal thicknesses. In this method, homogeneous transition zones are introduced into the metal sheets or strips by flexible rolling. However, this method has the drawback that only linear regions of the sheet metal blank can be altered in their thickness, so that non-linear transition zones are not possible. Furthermore, the transitions can be configured only in a relatively long-wave manner. For example, it is possible to produce only homogeneous transitions of 50 mm and more.

Another method according to the prior art in which different materials can also be used is known from DE 10 2004 035 887 A1. In this method, the thicker metal sheet is firstly rolled to a desired thickness dimension in the region of the connecting edge. Subsequently, the metal sheets can then be welded to one another.

However, this method has the problem that a specific roll stand or a specific rolling device is necessary. Moreover, apart from the additional special device, an additional operation and a longer manufacturing time, with correspondingly higher costs, are required. In addition, the method according to DE 10 2004 035 887 A1 may be used only for producing a linear connecting edge course. Moreover, after the rolling and prior to the connecting of the metal sheets, the rolled metal sheet still has to be trimmed, so that a further operation is necessary.

SUMMARY OF THE INVENTION

Starting from this prior art, the present invention is based on an aspect of providing a generic method that allows in a simple manner an application-specific configuration of a thickness transition of the connecting region of a sheet metal blank from one metal sheet thickness to another metal sheet thickness.

According to a first teaching of the present invention, the above-identified aspect is achieved, in a generic method, in that, prior to the connecting of the two metal sheets, at least the region of the connecting edge of the thicker metal sheet is pressed to a predefinable thickness in a forming tool in such a way that the connecting edges of the metal sheets have substantially the same thickness.

In contrast to known methods, the method according to the invention ensures in a simple manner an application-specific configuration of the region of transition, in a sheet metal blank, from one metal sheet thickness to another metal sheet thickness. The use of a forming tool for pressing the region of the connecting edge allows the contour of the metal sheet to be configured in this region in an application-specific manner and a predefinable thickness transition of the metal sheet to be produced in the connecting region with little effort and at correspondingly low costs. In particular, metal sheets having short metal sheet thickness transitions can be generated in a simple manner. In addition, the production of connecting regions extending non-linearly is also possible.

According to a first embodiment according to the invention, the connecting edge of the metal sheet can be formed in the forming tool together with the pressing of the metal sheet by separating off at least a part of the metal sheet. For example, after the pressing to the predefinable thickness in the region of the connecting edge, the metal sheet can remain compressed and at the same time a part of the metal sheet can be separated off, so that the metal sheet can be cut to length in a customised manner. The integration of the separating-off of a part of the metal sheet with the pressing of the metal sheet allows the manufacturing time to be reduced. In particular, the connecting edge of the metal sheet can be configured in such a way that no further preparatory step, such as for example trimming or subsequent cutting-to-length, is required.

In principle, a part of the metal sheet can be separated off in any desired manner, for example by means of laser cutting. However, it has been found that an exact connecting edge, including in particular a connecting edge having a non-linear course, can be achieved in a simple manner by means of punching. Moreover, a punching process can be combined in a particularly advantageous manner with the pressing process. For a punching process, a metal sheet has to be clamped immovably in order to achieve an exact edge course. This merely requires the provision of a hold-down means in the forming tool. For producing the desired thickness, the metal sheet is pressed by a forming tool, so that the compressed state can also be used for the punching process. It is thus possible to achieve an increase in the processing speed and accordingly lower manufacturing costs.

In a further embodiment according to the invention, the contour of an upper side of the metal sheet and/or the contour of an underside of the metal sheet can be deformed, at least in the region of the connecting edge of the metal sheet, by pressing. In other words, the contour of the metal sheet can, if required, be deformed on both sides, i.e. at the upper side and the underside, and adapted to the requirements for the subsequent use of the sheet metal blank. For example, the load curves of the component can be better designed by way of a selectable contour course of the upper side and/or the underside of the metal sheet.

In order to achieve a particularly application-specific contour course of a surface of the metal sheet, a first surface region of the metal sheet can have a first contour course and a second surface region of the metal sheet can have a second contour course, wherein the first contour course can differ from the second contour course. Thus, a first surface region can have a linear course and a second surface region can have a non-linear course, for example a curvate or angular course. The contour courses can also have different inclinations, for example a markedly descending course from the maximum thickness of the metal sheet toward the connecting edge, and also a less markedly descending course. It goes without saying that more than two differingly configured surface regions, both of the upper side and of the underside of the metal sheet, may be provided.

In a further embodiment of the method according to the invention, the metal sheets can be welded, preferably laser-welded, to one another at their connecting edges. Although this method requires connecting edge courses which correspond to one another in a particularly exact manner, tests have revealed that this method allows particularly good connecting transitions between the metal sheets to be achieved. In particular, according to the invention, the exact production of the connecting edges by punching also allows connecting edges having non-linear courses to be produced, so that the metal sheets can be laser-welded.

According to a second teaching of the present invention, the above-identified aspect is achieved, in a sheet metal blank, in particular a tailored blank, comprising at least two metal sheets of differing thickness that are connected to one another at connecting edges, in that at least the region of the connecting edge of the thicker metal sheet is shaped to a predefinable thickness by pressing using a forming tool in such a way that the connecting edges of the metal sheets display substantially the same thickness, and the connecting edges extend non-linearly. A non-linear connecting edge course allows the transition zone between metal sheets of differing thickness to be configured in a particularly application-specific manner and thus to be adapted to different requirements.

In order to be able to make a sheet metal blank from different materials and thus to adapt the sheet metal blank still more effectively to different requirements, the two connected metal sheets can, according to one embodiment according to the invention, be made of different metals or metal alloys, in particular steel or steel alloys. Thus, it may for example be a requirement that one region of the sheet metal blank is to have low ductility, while another region is to be extremely light. It goes without saying that the same metals or metal alloys can also be used.

Furthermore, the contour of an upper side of the metal sheet can extend linearly or non-linearly, at least in the region of the connecting edge of the metal sheet, and/or the contour of an underside of the metal sheet can extend linearly or non-linearly, at least in the region of the connecting edge of the metal sheet. In this way, it is possible to achieve, in addition to an application-specific course of the connecting edge, also an application-specific course of the surface contours of the metal sheet in the region of transition of the metal sheets, both on the upper side and on the underside. In particular, according to a further exemplary embodiment, the metal sheet can have, at the upper side and/or at the underside, a linear and/or non-linear contour course along the connecting edge and/or perpendicularly to the connecting edge.

According to a further teaching of the present invention, the above-identified aspect is achieved, in a forming tool, in particular for carrying out the method described hereinbefore, for manufacturing a metal sheet having a thickness transition at a connecting side, in that a die is provided with a female mould and a male mould with which at least the region of the connecting edge of the metal sheet can be pressed to a predefinable thickness to form a further metal sheet, the forming tool comprising separating means for separating off a part of the metal sheet and for forming the connecting edge of the metal sheet. The forming tool according to the invention can be used to manufacture in a simple and cost-effective manner sheet metal blanks having an application-specific thickness transition in the connecting region to a further metal sheet. The investment costs remain low on account of the simple construction of the forming tool.

In an embodiment according to the invention, the male mould and the female mould of the die can have a contour so that, prior to the connecting of the metal sheets, at least the connecting edge of the thicker metal sheet is pressed to a predefinable thickness. In other words, the male mould and the female mould can also be used to generate the desired thickness and contour.

In addition, in order to obtain a predefinable contour of the upper side and/or the underside of the region of the connecting edge, i.e. the region of transition from the original metal sheet thickness to the thickness of the connecting edge, the contour of the male mould and/or the contour of the female mould can be shaped in such a way that, at the upper side and/or at the underside of the metal sheet, a linear and/or non-linear contour course can be generated along the connecting edge and/or perpendicularly to the connecting edge. In other words, the die can be formed in such a way that an application-specific thickness transition can be generated in a simple manner in the region of the connecting edge.

As described hereinbefore, various apparatuses can be used as the separating means. However, separating means formed as a punching tool can be particularly advantageously combined with the die. The punching tool can comprise a hold-down means having a cutting function and a mating holding means.

According to a further embodiment of the forming tool according to the invention, the punching tool can have a non-linear cutting edge course in order to be able to generate in a simple manner a non-linear connecting edge course of the metal sheet.

BRIEF DESCRIPTION OF THE DRAWINGS

There are a large number of possible embodiments of the method according to the invention, the sheet metal blank according to the invention and the forming tool according to the invention. In this regard, reference is made for illustration purposes to the description of exemplary embodiments in conjunction with the drawings, in which.

DESCRIPTION

Figure 1:
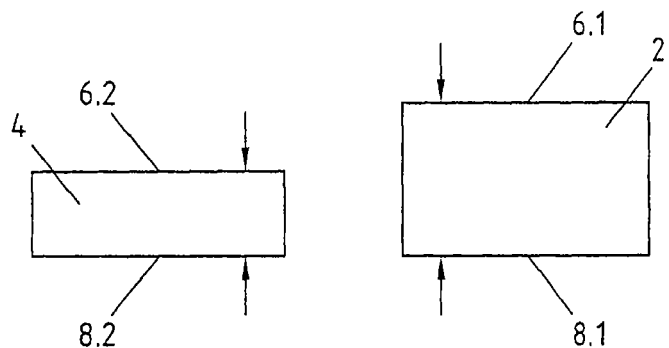
FIG. 1 is a schematic cross-sectional view of an exemplary embodiment of two metal sheets of differing thickness to be connected.

Firstly, FIG. 1 is a schematic cross-sectional view of an exemplary embodiment of two metal sheets 2 and 4 of differing thickness to be connected. The illustrated metal sheets 2 and 4 can be made of the same or a different steel or steel alloy. In addition, the metal sheets 2 and 4 comprise upper sides 6.1 and 6.2 respectively and undersides 8.1 and 8.2.

Figure 2:
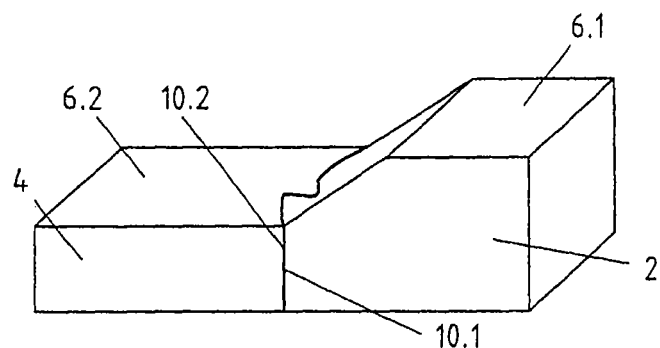
FIG. 2 is a schematic illustration of an exemplary embodiment of a sheet metal blank according to the present invention.

FIG. 2 is a schematic illustration of an exemplary embodiment of a sheet metal blank according to the present invention. In the illustrated example, the metal sheets 2 and 4 from FIG. 1 are joined together, preferably laser-welded, at their connecting edges 10.1 and 10.2. As may also be seen from the figure, the sheet metal blank displays a homogeneous transition from the metal sheet thickness of the thinner metal sheet 4 to the metal sheet thickness of the thicker metal sheet 2. In particular, according to the present exemplary embodiment, the metal sheets 2 and 4 are equally thick in the region of the connecting edges 10.1 and 10.2. Furthermore, the connecting edges 10.1 and 10.2 have a non-linear course at the upper sides 6.1 and 6.2 of the metal sheets 2 and 4. In principle, this course can be configured in any desired manner and also have corners or edges as well as extending linearly.

The method and the forming tool used to carry out the method for manufacturing a sheet metal blank according to the exemplary embodiment of FIG. 2 will be commented on hereinafter with reference to FIGS. 3a to 3c.

Figure 3A:
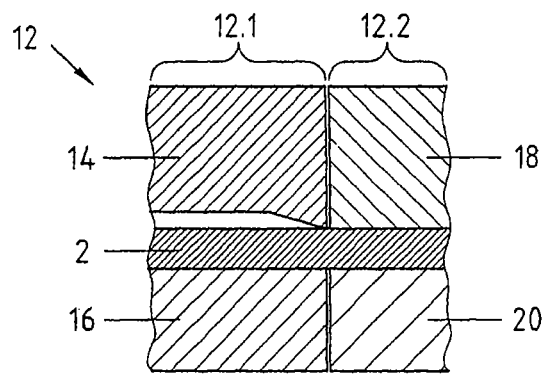
FIG. 3a is a schematic cross-sectional view of a first exemplary embodiment of the forming tool according to the present invention in a first state.

FIG. 3a is a schematic illustration of a first exemplary embodiment of the forming tool according to the present invention in a first state. The first state may be the starting position of the forming tool 12 after the metal sheet 2 has been supplied to the forming tool 12. The forming tool 12, in particular one forming tool 12, comprises in this case a die 12.1 and separating means 12.2. The die 12.1 has a male mould 14 and a female mould 16, wherein in the present example the predefinable contour of the metal sheet 2 can be generated by the male mould 14, and the female mould 16 serves merely as a rest and has a horizontal surface.

In the present exemplary embodiment, the separating means 12.2 are embodied as a punching tool 12.2 and comprise a hold-down means 18 having a cutting function and a mating holding means 20. According to other variants of the invention, the separating means 12.2 can in principle be configured in any desired manner, for example as a laser cutting device. A die 12.1 with a male mould 14 and a female mould 16 together with a punching tool 12.2 comprising a hold-down means 18 having a cutting function and a mating holding means 20 allow in a simple manner efficient processing.

Figure 3B:
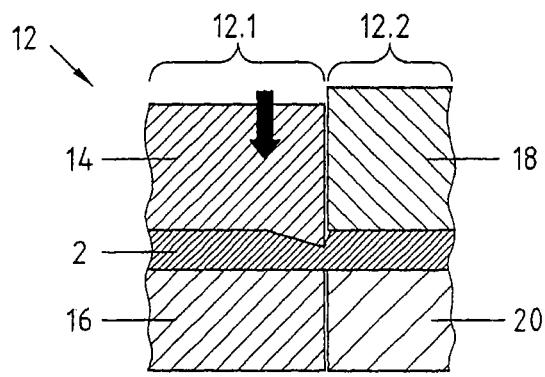
FIG. 3b is a schematic cross-sectional view of a first exemplary embodiment of the forming tool according to the present invention in a second state.

A subsequent state of the forming tool 12 according to the invention is illustrated schematically in FIG. 3b. While the punching tool 12.2 has remained unaltered in its state in relation to the state from FIG. 3a, the state of the die 12.1 has changed. In order to obtain the state of the die 12.1 according to FIG. 3b, a force is exerted on the male mould 14 in the direction indicated by the arrow. In other words, the metal sheet 2 is pressed. In principle, the force could also be exerted in the opposite direction. The contour of the metal sheet 2 in the region of the connecting edge is shaped by the pressing process. In particular, the metal sheet 2 is pressed in the region of the connecting edge to a predefinable thickness corresponding, in particular, to the thickness of the metal sheet to be connected to this metal sheet 2. In addition, the contour in the region of transition from the original thickness to the desired thickness in the region of the connecting edge can be shaped in any desired manner and optimally adapted to the specific requirement of the sheet metal blank, in particular the subsequent intended use thereof. For this purpose, the male mould 14 can have a corresponding contour. In the present example, the course of the contour of the metal sheet 2 descends linearly.

Figure 3C:
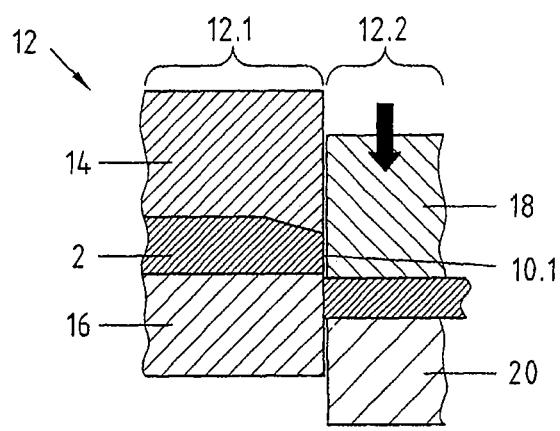
FIG. 3c is a schematic cross-sectional view of a first exemplary embodiment of the forming tool according to the present invention in a third state.

FIG. 3c is a schematic illustration of the first exemplary embodiment of the forming tool according to the present invention in a third state. As may be seen, the state of the die 12.1 has remained unaltered in relation to its state according to FIG. 3b. In other words, the male mould 14 and the female mould 16 respectively continue to exert a force on the metal sheet 2 and serve as a hold-down means for the contour-shaped metal sheet 2.

A force is exerted on the hold-down means 18 in the direction indicated by the arrow, so that said hold-down means separates off a part of the metal sheet 2 on account of its cutting function. It would also be conceivable to leave the separating means 12.2 in its position and to exert a further force (not illustrated) on the die 12.1 in order to introduce the separating-off of a part of the metal sheet 2 and for generating the connecting edge 10.1. The separating-off of the partial metal sheet generates the connecting edge 10.1 which has, in particular, a thickness corresponding to the connecting edge of the metal sheet to be connected. The connecting edge course of the metal sheet 2 corresponds to the shape of the corresponding connecting edge of the metal sheet to be connected. In general, the course of the connecting edge 10.1 can be configured in any desired manner. Thus, it is for example possible to generate both a linear course and a non-linear course, such as for example a curved or angular course.

In a subsequent operation, the previously shaped metal sheet 2 can be connected to a further metal sheet. In particular, the corresponding connecting edges allow the two metal sheets to be laser-welded to each other even in the case of non-linear courses.

Figure 4A:
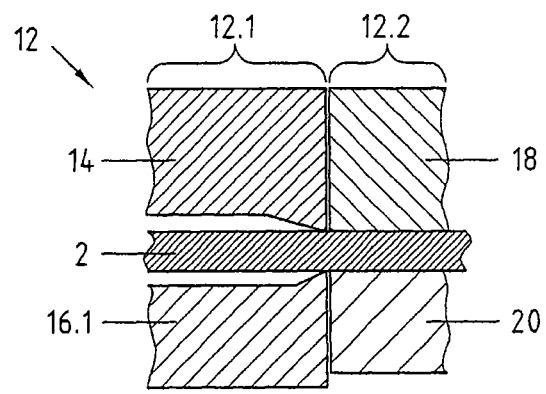
FIG. 4a is a schematic cross-sectional view of a second exemplary embodiment of the forming tool according to the present invention in a first state.
Figure 4B:
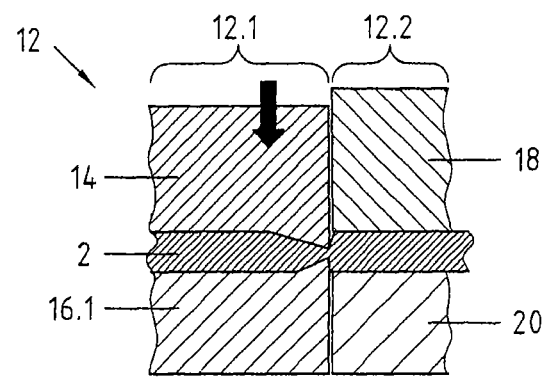
FIG. 4b is a schematic cross-sectional view of a second exemplary embodiment of the forming tool according to the present invention in a second state.
Figure 4C:
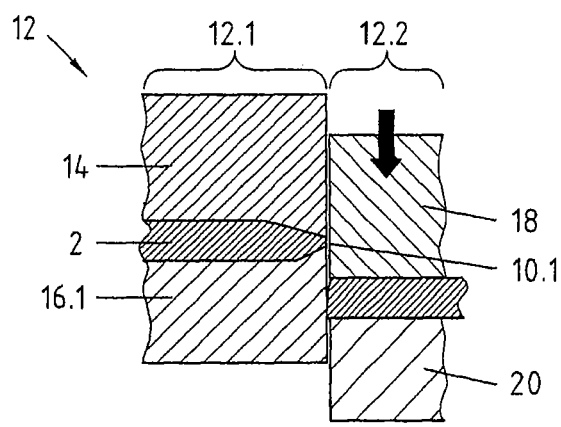
FIG. 4c is a schematic cross-sectional view of a second exemplary embodiment of the forming tool according to the present invention in a third state.

A second exemplary embodiment, illustrated in FIGS. 4a to 4c, of the forming tool according to the invention resembles the first exemplary embodiment according to FIGS. 3a to 3c. As may be seen from FIGS. 4a to 4c, the exemplary embodiments of the forming tools differ in that the female mould 16.1 has, compared to the female mould 16 from FIGS. 3a to 3c, a predefinable shape for generating a desired contour at the underside in the region of the connecting edge of the metal sheet 2. In the pressing or embossing step, both the upper side and the underside of the sheet 2 are deformed, so that a predefinable thickness of the metal sheet 2 is achieved in the region of the connecting edge 10.1. As merely a cross-sectional view is depicted in the present example, it is no more possible to see the course of the connecting edge, which linear or non-linear, than it is to see the contour course of the surfaces, which can be configured in a variable manner.

Figure 5A:
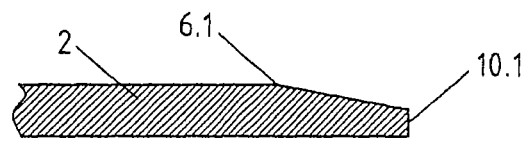
FIG. 5a is a schematic cross-sectional view of an exemplary embodiment of a contour form of the metal sheet according to the present invention.
Figure 5B:
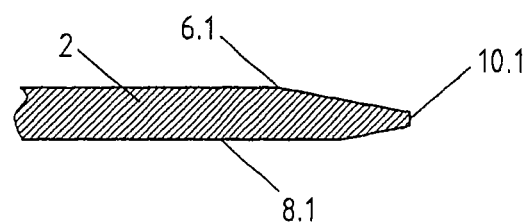
FIG. 5b is a schematic cross-sectional view of a further exemplary embodiment of a contour form of the metal sheet according to the present invention.
Figure 5C:
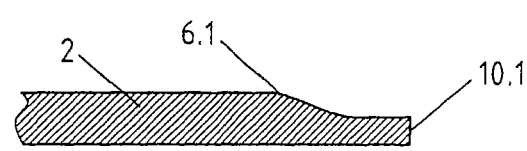
FIG. 5c is a schematic cross-sectional view of a further exemplary embodiment of a contour form of the metal sheet according to the present invention.

FIGS. 5a to 5c show possible contour courses of the metal sheet 2 in the region of the connecting edge 10.1. As may be seen from FIG. 5a, the contour of the upper side 6.1 of the metal sheet 2 extends in a linearly descending manner toward the connecting edge 10.1. In the metal sheet 2 of FIG. 5b, the contours both of the upper side 6.1 and of the underside 8.1 extend in a linearly descending manner in the direction of the connecting edge 10.1. FIG. 5c depicts a non-linear contour course of the upper side 6.1 of the metal sheet 2, in particular a curved course.

It goes without saying that, in accordance with other variants, it is also possible for only the contour of the underside and the contours of the underside and upper side to have a different course. Furthermore, a surface side of the metal sheet 2 can have in the region of the connecting edge 10.1 at least a first and a second region having different contour courses. Thus, it is conceivable for a linear course to be provided in the first region, while a non-linear course is provided in the second region. Parameters, such as the inclination of the contour, can also vary in various regions of an upper side and/or underside. In principle, any desired course of the contour of the upper side and the underside and also any desired course of the connecting edge can be produced.

The invention claimed is:

1. Method for manufacturing a sheet metal blank in which at least two metal sheets are to be connected to one another at their respective connecting edges, the at least two metal sheets having differing thickness, wherein
at least a region of the connecting edge of the thicker of the at least two metal sheets is pressed to a predefinable thickness in a forming tool in such a way that the connecting edges of the at least two metal sheets have substantially the same thickness; and
wherein the connecting edge of the thicker of the at least two metal sheets is formed in the forming tool together with the pressing of the thicker of the at least two metal sheets by separating off at least a part of the thicker of the at least two metal sheets; and
wherein the at least two sheets are subsequently connected to one another at their respective connecting edges.

2. Method according to claim 1, wherein the thicker of the at least two metal sheets is punched to form its connecting edge.

3. Method according to claim 1, wherein,
a contour of an upper side of the thicker of the two metal sheets and/or a contour of an underside of the thicker of the at least two metal sheets is deformed, at least in the region of the connecting edge of the thicker of the at least two metal sheets, by pressing.

4. Method according to claim 1, wherein at least a first surface region of the thicker of the at least two metal sheets is produced with a first contour course and a second surface region of the thicker of the at least two metal sheets is produced with a second contour course, the first contour course differing from the second contour course.

5. Method according to claim 1, wherein the at least two metal sheets are welded to one another at their connecting edges.

6. Method for manufacturing a sheet metal blank in which at least two metal sheets are to be connected to one another at their respective connecting edges, the at least two metal sheets having differing thickness, wherein
at least a region of the connecting edge of the thicker of the at least two metal sheets is pressed to a predefinable thickness in a forming tool in such a way that the connecting edges of the at least two metal sheets have substantially the same thickness; and
wherein at least a first surface region of the thicker of the at least two metal sheets is produced with a first contour course and a second surface region of the thicker of the at least two metal sheets is produced with a second contour course, the first contour course differing from the second contour course; and
wherein the at least two metal sheets are subsequently connected to one another at their respective connecting edges.

7. Method according to claim 6, wherein the at least two metal sheets are welded to one another at their connecting edges.

* * * * *